(12) United States Patent
Kaku et al.

(10) Patent No.: US 10,958,475 B2
(45) Date of Patent: Mar. 23, 2021

(54) REPEATER DEVICE

(71) Applicant: DENSO CORPORATION, Kariya (JP)

(72) Inventors: Yoshifumi Kaku, Kariya (JP); Taichi Itagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 59 days.

(21) Appl. No.: 16/228,927

(22) Filed: Dec. 21, 2018

(65) Prior Publication Data

US 2019/0222438 A1    Jul. 18, 2019

(30) Foreign Application Priority Data

Jan. 15, 2018 (JP) .............................. JP2018-004293

(51) Int. Cl.
| | |
|---|---|
| *H04L 12/46* | (2006.01) |
| *H04B 3/36* | (2006.01) |
| *H04L 12/931* | (2013.01) |
| *H04L 1/00* | (2006.01) |

(52) U.S. Cl.
CPC ............... *H04L 12/46* (2013.01); *H04B 3/36* (2013.01); *H04L 12/4625* (2013.01); *H04L 49/208* (2013.01); *H04L 2001/0097* (2013.01)

(58) Field of Classification Search
CPC ....... H04B 3/36; H04L 12/46; H04L 12/4625; H04L 2001/0097; H04L 49/208
See application file for complete search history.

(56) References Cited

U.S. PATENT DOCUMENTS

| | | | | |
|---|---|---|---|---|
| 2002/0075809 A1* | 6/2002 | Phaal | ................. | H04L 41/0213 370/245 |
| 2013/0054828 A1* | 2/2013 | Nishi | ................. | H04L 67/1034 709/232 |

FOREIGN PATENT DOCUMENTS

| | | |
|---|---|---|
| JP | 2000-183936 A | 6/2000 |
| JP | 2013-192128 A | 9/2013 |

* cited by examiner

*Primary Examiner* — Gregory B Sefcheck
*Assistant Examiner* — Debebe A Asefa
(74) *Attorney, Agent, or Firm* — Posz Law Group, PLC (57) ABSTRACT

A repeater device in a communication network includes a microcomputer configured to determine whether the repeater device will function as a mirroring switch that generates and transfers a mirror frame, or as a mirror-transfer switch that transfers the mirror frame. When the repeater device functions as a mirror switch and performs port mirroring, the repeater device adds monitor port and destination port information of the mirroring switch to the mirror frame. When the repeater device functions as a mirror-transfer switch, the repeater device adds sender port and destination port information of the mirror-transfer switch to the mirror frame. A monitor device in the communication network uses information in the mirror frame to identify a mirror source device in the network.

13 Claims, 3 Drawing Sheets

REPEATER DEVICE

CROSS REFERENCE TO RELATED APPLICATION

The present application is based on and claims the benefit of priority of Japanese Patent Application No. 2018-004293, filed on Jan. 15, 2018, the disclosure of which is incorporated herein by reference.

TECHNICAL FIELD

The present disclosure relates to a repeater device that is part of a communication network.

BACKGROUND INFORMATION

Communications networks may include a plurality of network switches functioning as repeaters that receive and send communication frames toward intended destination devices. Repeaters may mirror or duplicate a communication frame and send the mirrored frame to a monitoring device in the network so that the monitoring device may better monitor network traffic and network communications. Such a monitoring scheme may be called remote monitoring. A port that performs the port mirroring and is monitored by the monitoring device may be referred to as a monitor port. A device connected to the monitor port that transmits a source frame that is mirrored by the port mirroring function of the monitor port is referred to as a mirror source device.

However, problems with remote monitoring in a communication network may arise, because it is difficult for the monitoring device to identify the mirror source device. As such, repeater devices are subject to improvement.

SUMMARY

It is an object of the present disclosure to provide a repeater device that enables a mirror source device to be easily identified based on a mirror frame.

Using a repeater device configured as described herein, the monitoring device receiving the mirror frame can identify which port of which repeater device is the monitor port based on the transfer path information included in the mirror frame. Then, upon identifying the monitor port, the monitoring device can identify the mirror source device connected to the monitor port.

BRIEF DESCRIPTION OF THE DRAWINGS

Objects, features, and advantages of the present disclosure will become more apparent from the following detailed description made with reference to the accompanying drawings, in which.

DETAILED DESCRIPTION

An embodiment of the present disclosure is described in the following paragraphs with reference to the drawings.

1. Configuration

Figure 1:
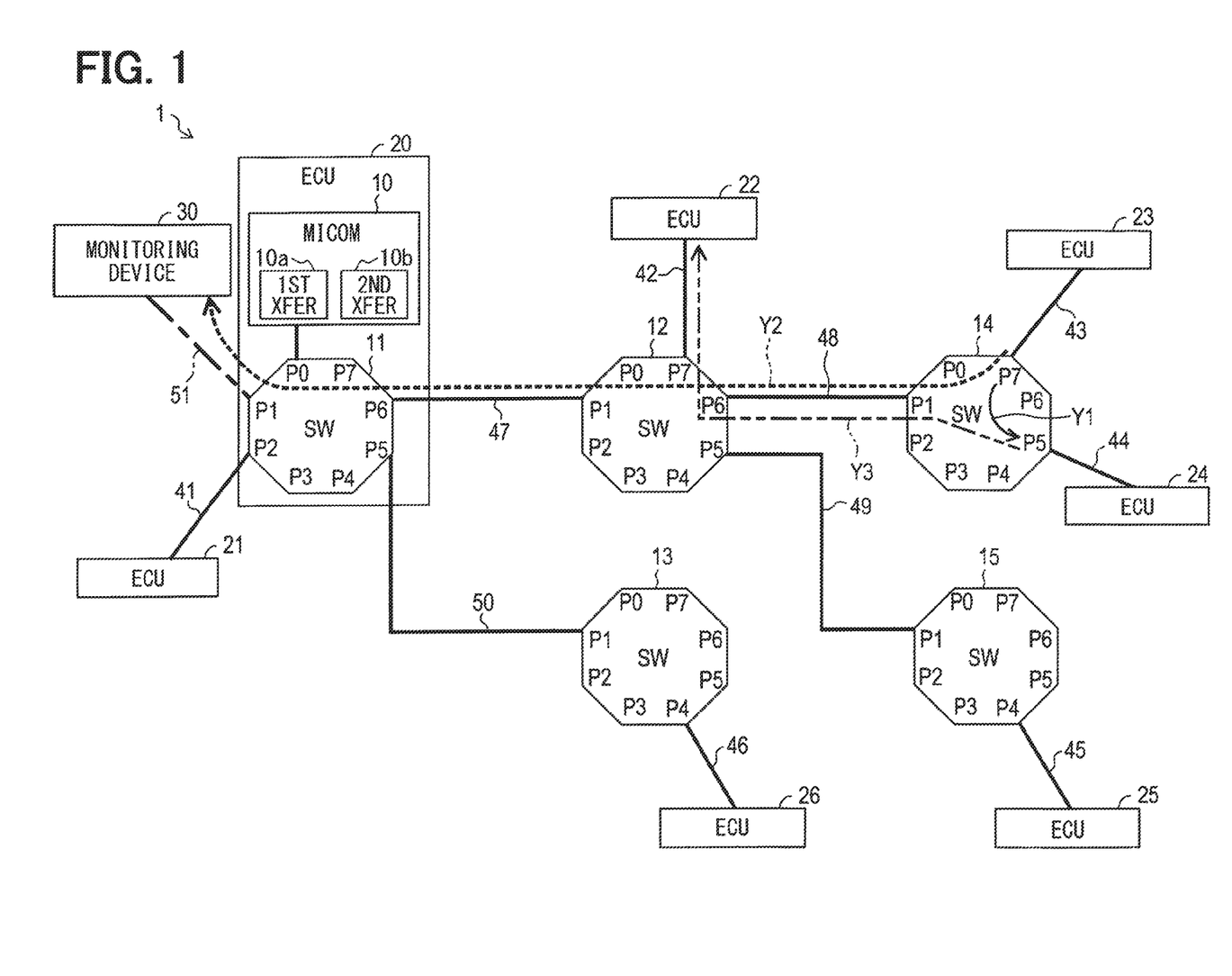
FIG. 1 illustrates a configuration of a communication network using a repeater device as a switch.

With reference to FIG. 1, a communication network 1 of the present embodiment is shown. The communication network 1 may be an Ethernet network installed in a vehicle such as a passenger car (not shown), where the communication network 1 is part of a communication system in the vehicle. An Ethernet network may be a network that operates following Ethernet standards and protocols, for example, IEEE 802.3.

Figure 2:
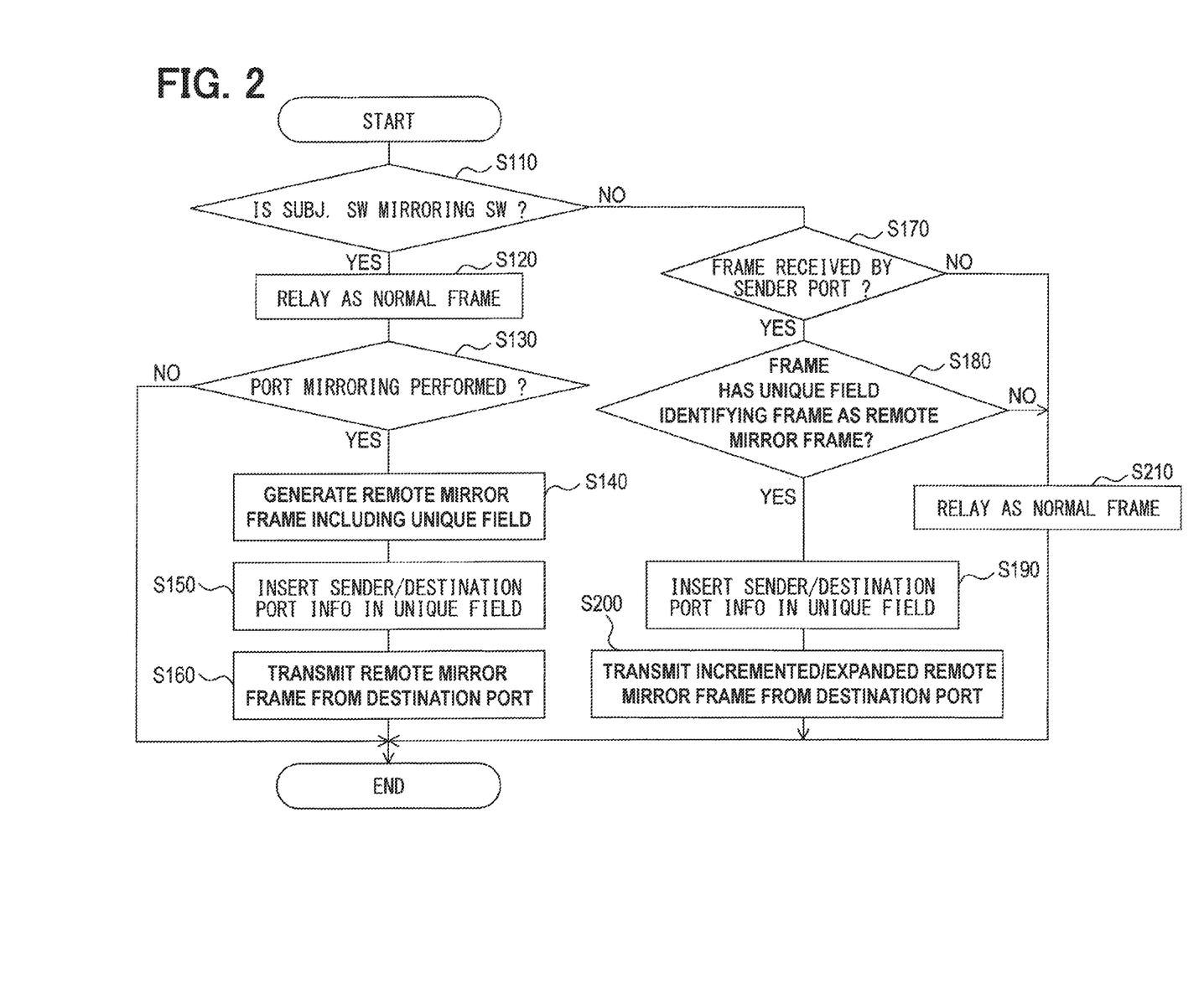
FIG. 2 is a flowchart of a port mirroring process.

As shown in FIG. 1, the communication network 1 includes Ethernet switches 11, 12, 13, 14, and 15 (referred to collectively as switches 11-15 or switches 11 to 15). The switches 11-15 are Ethernet network switches functioning as repeaters. The switches 11-15 may generally be referred to as repeaters or repeater devices. A repeater device may receive a communication frame and output the communication frame (i.e., relay or retransmit the communication frame). That is, the communication network 1 includes a plurality of repeater devices 11-15, i.e., switches 11-15. As shown in FIG. 1 and FIG. 2, each switch may be abbreviated "SW." While the communication network 1 in FIG. 1 is a non-limiting example that shows five switches 11-15, the number of switches in the network may be greater than five or less than five.

The switch 11 is incorporated in an electronic control unit (ECU) 20 that is part of the communication network 1. ECU is an abbreviation of "Electronic Control Unit". The communication network 1 also includes ECUs 21, 22, 23, 24, 25, and 26 as devices communicating with each other via one or more of the switches 11 to 15.

The switches 11 to 15 are, for example, layer 2 switches (i.e., "L2 switches") that communicate and relay (i.e., retransmit) data according to the Ethernet standard (e.g., IEEE 802.3). Each of the switches 11 to 15 has a plurality of ports. For example, each of the switches 11 to 15 may have eight ports P0, P1, P2, P3, P4, P5, P6, and P7, as shown in FIG. 1.

The ECU 21 is connected to the port P2 of the switch 11 via a communication line 41. The ECU 22 is connected to the port P7 of the switch 12 via a communication line 42. The ECU 23 is connected to the port P7 of the switch 14 via a communication line 43. The ECU 24 is connected to the port P5 of the switch 14 via a communication line 44. The ECU 25 is connected to the port P4 of the switch 15 via a communication line 45. The ECU 26 is connected to the port P4 of the switch 13 via a communication line 46.

The port P6 of the switch 11 and the port P1 of the switch 12 are connected via a communication line 47. The port P6 of the switch 12 and the port P1 of the switch 14 are connected via a communication line 48. The port P5 of the switch 12 and the port P1 of the switch 15 are connected via a communication line 49. The port P5 of the switch 11 and the port P1 of the switch 13 are connected via a communication line 50.

The electronic control units (ECUs) 20-26 are embedded systems in the vehicle that may control one or more electrical systems or subsystems in the vehicle. For example, the ECUs 20-26 may be used to control the vehicle engine, powertrain, transmission, braking, and suspension. Though not explicitly illustrated in the drawings, each of the ECUs 20-26 may include a microcontroller/microcomputer including a CPU or like processing device, memory such as SRAM, EEPROM, and flash memory, input/output (I/O) circuitry, and communication circuitry.

A microcomputer 10 is included as an arithmetic unit in the ECU 20. The microcomputer 10 is connected to the port P0 of the switch 11. As such, the microcomputer 10 of the ECU 20 can communicate with the ECU 21 via the switch 11. The microcomputer 10 is also capable of communicating with the other ECUs 22-26 via the switch 11 and the one or more of the other switches 12 to 15. Though not illustrated, each of the ECUs 21 to 26 also includes a microcomputer 10 as an arithmetic unit. The microcomputer 10 includes a CPU, a ROM, a RAM, and I/O circuitry.

The microcomputer 10 may also include a first transfer unit 10a (i.e., "1ST XFER" in FIG. 1) and a second transfer unit 10b (i.e., "2ND XFER" in FIG. 1). Depending on the function and designation of the switch, the first transfer unit 10a may execute and perform specific processes described below in greater detail. Depending on the function and designation of the switch, the second transfer unit 10b may execute and perform specific processes described below in greater detail, where the processes executed and performed by the first transfer unit 10a differ from the specific processes executed and performed by the second transfer unit 10b.

The ECUs 20-25 may also be considered as repeater devices. For example, as shown in FIG. 1, the ECU 20 with the microcomputer 10 that includes the first transfer unit 10a and the second transfer unit 10b, and switch 11 may be considered as a repeater device, even though the switch (i.e., repeater) 11 itself is performing the transmission and retransmission functions of generated and received communication frames. That is, the repeater device includes a microcomputer 10 with a first transfer unit 10a and second transfer unit 10b, and a switch (e.g., switch 11).

A monitoring device 30 for monitoring traffic in the communication network 1 is detachably connected to the P1 port of the switch 11 via a communication line 51.

2. Process

Figure 3:
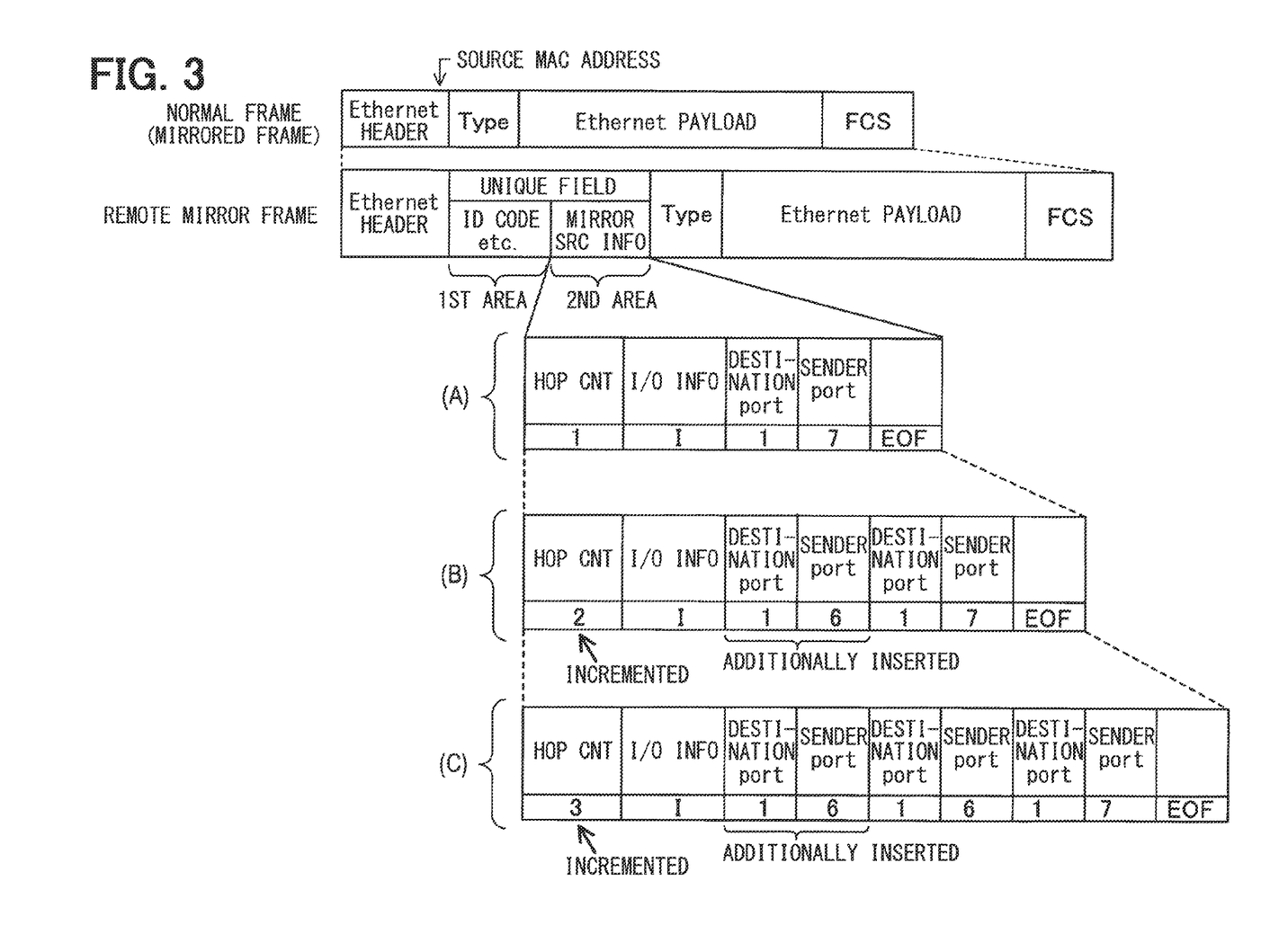
FIG. 3 illustrates a frame configuration and operational effects by the switch.

With reference to FIGS. 2 and 3, the port mirroring process performed by each of the switches 11 to 15 is described.

In the following description, a description of a switch without a reference numeral may describe any of the switches 11 to 15, unless otherwise indicated. That is, a description of a switch may apply to all switches 11 to 15, unless described otherwise. Likewise, a description of a port without a reference numeral may describe any of the ports P0 to P7, unless otherwise described. That is, a description of a port may apply to all ports P0 to P7, unless described otherwise.

A "subject switch" may be used to describe an individual switch itself, as to differentiate the subject switch from the plurality of other switches when a plurality of switches are described.

A switch that performs port mirroring may be called "a mirroring implemented switch," or more simply "a mirroring switch." A frame duplicated by port mirroring may be called "a mirror frame."

A port that performs port mirroring may be called a monitor port. Mirroring of a frame from another switch that is received by the monitor port of a subject switch may be called "reception mirroring." Mirroring of a frame that is transmitted by the monitor port of the subject switch to another switch may be called "transmission mirroring." A switch that relays/retransmits the mirror frame transmitted by the mirroring switch to the monitoring device 30 may be referred to as "a mirror-transfer switch."

A further distinction may be made amongst the plurality of ports on the subject switch. That is, a single switch may have one port on the switch designated as the "sender port" and one port on the switch designated as the "destination port." The designations of sender port and destination port may be best understood from the viewpoint of the switch itself. When a switch receives a communication frame, the sender port may be the input port that then "sends" or relays the communication frame to a destination port on the same switch (i.e., the subject switch itself). The "destination" on the switch is the port on the subject switch where the frame is to be output for further transmission and/or processing in the communication network 1. The designation of ports on the subject switch is not always static, that is, the sender port and destination port designations for the subject switch may change depending on the circumstances (e.g., the function of the switch, the type of frame processed by the switch, and which of the ports P0-P7 are to serve as inputs and outputs on the subject switch).

For the mirroring switch described above, the sender port may be the monitor port, and the destination port may be the port from which the mirror frame, as duplicated by the subject switch itself, is output to the monitoring device 30.

For the mirror-transfer switch described above, the sender port may be an input port on the subject switch that inputs a mirror frame sent by another switch, and the destination port is an output port on the subject switch that outputs the mirror frame sent by the other switch for transfer to the monitoring device 30. In other words, for the mirror transfer switch, the sender port inputs the mirror frame from another switch, and the destination port outputs the mirror frame from the other switch.

As described in greater detail below, since the mirroring switch may perform processing before the mirror-transfer switch, the destination port on the mirroring switch may be referred to as "a first destination port," while the destination ports on the mirror-transfer switch or switches may be referred to as "subsequent destination port(s)," to provide further distinction among the different destination ports. In other words, in a communication stream with a plurality of switches, the first destination port may refer to the destination port on the switch where the frame is first output in the communication stream, and the subsequent destination ports may refer to the destination ports of the switches downstream of the first destination port.

Each of the switches 11 to 15 can be set to function either as a mirroring switch or as a mirror-transfer switch. In the communication network 1, when the above-described remote monitoring is performed, one of the switches 12 to 15 is set as a mirroring switch, and one or more switches on the mirror frame transfer route from the mirroring switch to the monitoring device 30 are set as the mirror-transfer switches. As such, when the remote monitoring is performed with the configuration shown in FIG. 1, the switch 11 is at least set as a mirror-transfer switch. For the switches in the communication network 1 functioning as either the mirroring switch or the mirror-transfer switch(es), one of the ports among ports P0 to P7 on each switch is designated as the sender port, and another of the ports on each switch is designated as the destination port. A switch that is not set as a mirroring switch and has two of its eight ports respectively set as the sender port and destination port may function as a mirror-transfer switch. For the switch functioning as the mirroring switch, the port mirroring performed by that mirroring switch may be further designated as either reception mirroring or transmission mirroring. Setting the mirroring switch to either reception mirroring or transmission mirroring may be referred to as the input/output (I/O) setting.

The designation of a switch in the communication network 1 to function as either a mirroring switch or a mirror-transfer switch is not static and can change based on the circumstances. For example, for one mirror frame a switch may be designated as a mirroring switch, but for another mirror frame, the same switch may be designated as a mirror-transfer switch. In one example, the switch 12 may receive a communication frame from ECU 22 at the port P7 and the switch 12 may be set to perform port mirroring to mirror the received frame and generate a mirror frame. In this example, the switch 12 functions as a mirroring switch. However, in another example, the switch 12 may receive a mirror frame from switch 14 at the port P6 and output the mirror frame at the port P1 for further transmission downstream. In this example, the switch 12 functions as a mirror-transfer switch.

Either a setting operation or sending individual setting signals to each of the switches 11 to 15 may be used to designate the switches 11 to 15 as either the mirroring switch or the mirror-transfer switch(es), to designate which ports on the switch will function as the sender port and the destination port, and to set the I/O setting for the mirroring switch. The settings of each switch may also be implemented, for example by signals sent from the microcomputer 10. That is, the microcomputer 10 may determine whether a switch in the communication network 1 will function as the mirroring switch or as the mirror-transfer switch.

The processes described at S110 to S210 of FIG. 2 are described generally as being performed by the switches (e.g., switches 11 to 15). However, the processes may be performed by the microcomputer 10 in conjunction with the switch (e.g., the microcomputer executing a program or instruction set to control the switch to perform the function. Certain processes may be executed by dedicated hardware or circuits such as the first transfer unit 10*a* or the second transfer unit 10*b* (e.g., the first transfer unit 10*a* controlling the switch to perform the specific functions).

When a switch receives a frame from any of the ports P0 to P7, the switch performs the process shown in FIG. 2. As shown in FIG. 2, at S110, the subject switch (i.e., the switch receiving the frame) determines whether the switch itself will function as a mirroring switch. That is, the subject switch determines whether it will perform a mirroring function or a mirror transfer function. If the subject switch determines that it will function as a mirroring switch, i.e. "YES" at S110, the process proceeds to S120.

At S120, the switch relays (i.e., retransmits) the received frame as a normal frame to its intended destination. That is, the subject switch performs a normal relay process. Here, "normal" may mean in accordance with an Ethernet standard.

Referring now to FIG. 3, as shown in the first row of FIG. 3 (i.e., the uppermost row), the normal frame includes an Ethernet header, a type, an Ethernet payload, and an FCS field. A source MAC address field (that is, a sender MAC address) is stored as the end of the Ethernet header. MAC is an abbreviation for "Media Access Control." The Ethernet payload is a body of data transferred in the frame. FCS stands for "Frame Check Sequence."

Returning again to FIG. 2, after the switch performs the relay process at S120, the process proceeds to S130. At S130, the subject switch determines whether to perform port mirroring. Specifically, when the I/O setting is reception mirroring and a frame is received by the sender port, the subject switch determines that port mirroring is to be performed. Alternatively, when the I/O setting is transmission mirroring and the received frame is transmitted from the sender port (e.g., to a destination port on the subject switch), the subject switch determines that port mirroring is to be performed.

When the switch determines at S130 that port mirroring will not be performed, i.e., "NO" at S130, the switch ends the process shown in FIG. 2 without performing any further processes. However, when the switch determines at S130 that port mirroring is to be performed, i.e., "YES" at S130, the process proceeds to S140.

The processes at S140, S150, and S160 (i.e., S140 to S160) are associated with a port mirroring function and performed by the switch. The port mirroring processes at S140 to S160 may also be performed by microcomputer 10 in conjunction with the switch or be performed by the first transfer unit 10*a* in conjunction with the switch.

At S140, when the I/O setting is reception mirroring, the switch generates a mirror frame by duplicating a frame received at the sender port (i.e., monitor port). Alternatively, at S140, when the I/O setting is transmission mirroring, the switch generates a mirror frame by duplicating a frame transmitted from the sender port. When the I/O setting is transmission mirroring, the mirror frame may be generated at S140 by duplicating a received frame, since the frame transmitted from the sender port is the same as the received frame.

At S140, the switch adds a field to the generated mirror frame called a unique field. The mirror frame to which the unique field has been added is called a remote mirror frame.

With reference again to FIG. 3, the remote mirror frame includes a unique field added at a position between the Ethernet header and the type field. More specifically, the unique field is at a position between the source MAC address field and the type field. The unique field includes a first area in which an identification code or like identifier is stored, and a second area in which mirror source information is stored.

The identification code stored in the first area of the unique field is a code that identifies the frame having the unique field as a mirror frame. The mirror source information stored in the second area of the unique field is used by the monitoring device 30 for identifying the mirror source device.

The mirror source information includes (i) a hop count value representing the number of switches the remote mirror frame has passed (i.e., the number of "hops"), (ii) I/O information indicating the I/O setting contents, and (iii) information indicating the destination port and the sender port of the switch that transmitted the remote mirror frame. In FIG. 3, "I" in a I/O information column indicates that the I/O setting is reception mirroring. "0" in the I/O information column indicates that the I/O setting is transmission mirroring.

With reference again to FIG. 2, at S140, the switch generates a mirror frame (i.e., a remote mirror frame) to which a unique field is added, and the process proceeds to S150. At S150, as shown in a row (A) of FIG. 3, the switch inserts (i) information indicating a sender port (also referred to as sender port information) and (ii) information indicating a destination port (also referred to as destination port information) in a preset order in the second field of the unique field. The sender port information and the destination port information may be referred to collectively as "transfer route information." That is, transfer route information includes both the sender port information and the destination port information, and the transfer route information may include all of the sender port information and the destination port information in the unique field. In the present embodiment, the sender port information is inserted after the destination port information. At S150, the switch inserts EOF indicating that it is an end of the unique field at a position after the sender port information. EOF stands for "End Of Field." In the present embodiment, the sender port information and the destination port information are port numbers, that is, a number corresponding to one of the ports P0-P7. As shown in row (A) of FIG. 3, the sender port information is "7" (e.g., P7 of the subject switch) and the destination port information is "1" (e.g., P1 of the subject switch).

At S150, the switch also inserts the above-described identification code in the first area of the unique field, and inserts the hop count value and the I/O information before the destination port information. The hop count value inserted at S150 is "1," which is the initial, or starting count value.

At S160, the switch transmits the mirror frame from the destination port after performing the process at S150, and the process shown in FIG. 2 then ends.

When the processes at S140-S160 are performed by the first transfer unit 10a in the switch, the first transfer unit 10a adds information about the monitor port in the subject switch that performs the port mirroring (i.e., information about the sender port), and information about the destination port in the subject switch to the mirror frame. That is, the first transfer unit 10a adds the transfer route information of the mirroring switch to the mirror frame. The first transfer unit 10a then outputs the mirror frame having the added transfer route information from the destination port of the subject switch.

Returning again to S110, when the switch determines at S110 that the switch itself is not to be set as the mirroring switch, i.e., "NO" at S110, the process proceeds to S170.

The processes at S170, S180, S190, and S200 (i.e., S170 to S200) are performed by the switch when the subject switch is not functioning as a mirroring switch. As such, the processes at S170 to S200 may be performed by the switch, the microcomputer 10 in conjunction with the switch, or the second transfer unit 10b in conjunction with the switch.

At S170, the switch determines whether or not a frame has been received by the sender port of the switch. When the switch determines that a frame has been received by the sender port, i.e., "YES" at S170, the process proceeds to S180. When the switch determines that a frame has been received by the sender port of the switch and the process proceeds from S170 to S180, the switch is set as a mirror-transfer switch. That is, the switch is designated as a mirror-transfer switch.

At S180, the switch determines whether a unique field is inserted in the received frame, that is, the frame received by the sender port. For example, as described above, the switch may determine that a unique field is inserted if there is an identification code at a position after the Ethernet header, or more specifically, after the source MAC address field.

When the switch determines at S180 that a unique field is inserted in the received frame, i.e., "YES" at S180, the switch determines that the received frame is a mirror frame, and the process proceeds to S190. At S190, as shown in row (B) or row (C) in FIG. 3, the switch inserts the sender port information indicating the port on the switch functioning as the sender port and the destination port information in a preset order at a position immediately after the I/O information in the second area of the unique field. In FIG. 3, the position where this information is inserted is labeled "ADDITIONALLY INSERTED." In the present embodiment, just like S150, the sender port information is inserted after the destination port information. The switch also increments the hop count value in the unique field of the received mirror frame at S190.

After S190, the process proceeds to S200 and the switch transmits the mirror frame from the destination port. After S200, the process shown in FIG. 2 ends.

When the processes at S170-S200 are performed by the second transfer unit 10b in the switch, the second transfer unit 10b adds information regarding the port of the subject switch receiving the mirror frame (i.e., sender port information), and information regarding the destination port of the subject switch that outputs the mirror frame either to the monitoring device 30, or for further transmission toward the monitoring device 30. That is, the second transfer unit 10b adds the transfer route information of the subject mirror-transfer switch to the mirror frame. The second transfer unit 10b then outputs the mirror frame having the added transfer route information from the destination port of the subject switch.

Returning to S170, when the switch determines at S170 that a frame has not been received by the sender port, or when the sender port is not set, i.e., "NO" at S170, the process proceeds to S210.

When the switch determines at S180 that a unique field is not inserted in the received frame, the process also proceeds to S210.

At S210, the switch relays (i.e., retransmits) the received frame as a normal frame, similar to the process performed at S120, and the process shown in FIG. 2 ends.

The process shown in FIG. 2 may be implemented by one or more hardware devices provided in the switch. For example, the one or more hardware devices implementing the process shown in FIG. 2 may be realized as a digital circuit or digital circuit elements, an analog circuit or analog circuit elements, or as a combination of digital/analog circuits and circuit elements. The first transfer unit 10a and the second transfer unit 10b may be realized as specialized hardware within each switch. That is the first transfer unit 10a may be configured as a specialized circuit for performing the processes at S140 to S160. For example, the first transfer unit 10a may be realized as an application-specific integrated circuit (ASIC), field-programmable gate array (FPGA), or like specialized circuit configured to perform the processes at S140 to S160. Likewise, the second transfer unit 10b may be configured as a specialized circuit for performing the processes at S170 to S200. As described above, the switch may include a microcomputer, and the process in FIG. 2 may alternatively be performed by the microcomputer, either wholly, or in part. When the microcomputer 10 in the switch wholly performs all of the processes shown in FIG. 2 (e.g., S110-S210), the first transfer unit 10a and the second transfer unit 10b may be considered as functional blocks of the microcomputer 10 instead of as individual hardware elements. The microcomputer in the switch has a CPU and a semiconductor memory (hereinafter, a memory) such as RAM and/or ROM. Some or all of the processes (e.g., S110-S200) performed by the switch in FIG. 2 may be realized by an execution by the CPU of a program/instruction set stored in the memory of the switch. The execution of such a program/instruction set may cause the switch to perform all or part of the processes shown in FIG. 2. The memory is a non-transitory, tangible storage medium of the microcomputer configured to store a program/instruction set for execution by the CPU. The above-described memory may be a non-transitory, tangible storage medium for storing a program.

3. Example Operation

An example operation example realized by the switches 11 to 15 performing the process shown in FIG. 2 is now described. The example operation is described with reference to the communication network 1 of FIG. 1, which assumes an example situation where a frame is transmitted from the ECU 23 connected to the switch 14 and where the transmitted frame is monitored by the monitoring device 30.

In this example, the settings for each of the switches 11 to 15 may be set up in advance. The switch 14 is set as a mirroring switch with an I/O setting set to reception mirroring. Both of the switches 11 and 12 are set as mirror-transfer switches.

In the switch 14, the port P7 connecting the ECU 23 is set as the sender port, and the port P1 connected to the switch 12 is set as the destination port.

In the switch 12, the port P6 connected to the port P1 of the switch 14 is set as the sender port, and the port P1 connected to the switch 11 is set as the destination port.

In the switch 11, the port P6 connected to the port P1 of the switch 12 is set as the sender port, and the port P1 connected to the monitoring device 30 is set as the destination port.

That is, the mirror frame generated by the port mirroring function of the switch 14 is set to be transferred to the monitoring device 30 via the switch 12 and the switch 11.

The example operation further assumes that the ECU 23 transmits a frame addressed to the ECU 24 when the above-described settings are made. Upon receiving a frame from the ECU 23, the switch 14 determines that the switch 14 itself will function as a mirroring switch, i.e., "YES" at S110 of FIG. 2, and the switch 14 transmits the frame (that is, a normal frame) received from the ECU 23 for transfer to the ECU 24 from the port P5 of switch 14. The retransmission or relay of the frame as a normal frame corresponds to the process at S120 of FIG. 2.

In FIG. 1, a solid line arrow Y1 indicates the relay or retransmission of a normal frame from the ECU 23 to the ECU 24 via the switch 14.

The switch 14 receiving the frame from the ECU 23 determines that port mirroring is to be performed, i.e., "YES" at S130 in FIG. 2. As such, the switch 14 designates the port P7 as the sender port and sets the I/O setting to reception mirroring.

When performing the port mirroring, following the processes of S140 and S150 in FIG. 2, the switch 14 duplicates the frame received by the port P7, adds a unique field to the duplicated frame, and generates a remote mirror frame, as shown in FIG. 3.

In the unique field of the remote mirror frame, as shown in row (A) of FIG. 3, a number corresponding to the port P7 (i.e., 7) of the switch 14 is inserted as the sender port information and a number corresponding to the port P1 (i.e., 1) of the switch 14 is inserted as the destination port information. "1" is also inserted as the hop count value in the unique field.

The switch 14 then performs the process at S160 of FIG. 2 and transmits the generated remote mirror frame from the port P1 that is set as the destination port.

The remote mirror frame transmitted from the port P1 of the switch 14 is input to the port P6 of the switch 12. Upon receiving the remote mirror frame, the switch 12 performs the process at S110 of FIG. 2. Upon receiving the remote mirror frame, the switch 12 determines that the switch itself will not function as a mirroring switch, i.e., makes a "NO" determination at S110 of FIG. 2. As described above, since the port P6 of the switch 12 is designated as the sender port, the switch 12 determines that the frame transmitted by the switch 14 is received by the sender port P6 of the switch 12, i.e., "YES" at S170 of FIG. 2. Also, as described above, because the switch 14 adds a unique field to the remote mirror frame, the switch 12 determines that the received frame includes a unique field, i.e., "YES" at S180 of FIG. 2. That is, the switch 12 determines that a remote mirror frame with a unique field has been received by the sender port P6 of the switch 12.

The switch 12 then performs the process at S190 of FIG. 2 and inserts the sender port information and the destination port information of the switch 12 in the unique field of the remote mirror frame, as shown in row (B) of FIG. 3. As shown in row (B) of FIG. 3, the sender and destination port information of the switch 12 may be inserted at a position before the sender and destination portion information inserted by the switch 14. The switch 12 increments the hop count value in the unique field. As such, the hop count value shown in row (B) of FIG. 3 changes from "1" to "2."

That is, the switch 12 inserts a number corresponding to the sender port P6 (i.e., 6) as the sender port information in the unique field of the remote mirror frame, inserts a number corresponding to the destination port P1 (i.e., 1) as the destination port information in the unique field of the remote mirror frame, and increments the hop count value to "2."

The switch 12 then performs the process at S200 of FIG. 2 and transmits the remote mirror frame from the destination port P1 after adding information to the unique field.

The remote mirror frame transmitted from the destination port P1 of the switch 12 is input to the sender port P6 of the switch 11. After receiving the remote mirror frame, the switch 11 then performs the same operations that were previously performed by the switch 12, that is, the processes at S110, S170, S180, S190, and S200 in FIG. 2. As such, the switch 11 adds information to the unique field of the remote mirror frame at S190. The switch 11 adds a number corresponding to the sender port P6 (i.e., 6) of the switch 11 as the sender port information, and adds a number corresponding to the destination port P1 (i.e., 1) of the switch 11 as the destination port information, as shown in the row (C) of FIG. 3. The switch 11 also increments the hop count value of the unique field to "3," as shown in row (C) of FIG. 3.

The switch 11 then performs the process at S200 of FIG. 2 and transmits the remote mirror frame from the destination port P1. The remote mirror frame transmitted from the destination port P1 of the switch 11 is input to the monitoring device 30.

In FIG. 1, a dotted arrow Y2 indicates a transfer of a remote mirror frame from the switch 14 to the monitoring device 30 via the switch 12 and the switch 11.

By referring to the remote mirror frame, the monitoring device 30 can identify that the ECU 23 is the mirror source device from information in the unique field of the mirror source frame. That is, the monitoring device 30 is enabled to identify the mirror source device 23 by referring to the mirror source information in the remote mirror frame.

The following example describes a normal frame that is relayed (i.e. retransmitted) without port mirroring. This example assumes that the ECU 24 transmits a frame that is addressed to the ECU 22. Upon receiving the frame from the ECU 24, the switch 14 transmits the received frame from the port P1 as a normal frame for transfer to the ECU 22 following the process at S120 of FIG. 2, but the switch 14 determines that port mirroring will not be performed, i.e., "NO" at S130 of FIG. 2.

As such, the switch 12 receives the frame at the sender port P6, but the received frame is a normal frame without a unique field. When the switch 12 performs the processes at S170 and S180 in FIG. 2, the switch 12 determines that the frame is received by the sender port P6, i.e., "YES" at S170, but the switch 12 determines that the frame does not have a unique field, i.e., "NO" at S180. As such, the process in FIG. 2 proceeds to S210 and the switch 12 transmits the received frame from the port P7 to transfer the frame to the ECU 22.

The two-small-dash-one-long-dash arrow Y3 shown in FIG. 1 indicates the transmission or relay of a normal frame from the ECU 24 via the switch 14 and the switch 12 to the ECU 22.

4. Effects

The following advantageous effects may be realized using the above-described embodiment.

The monitoring device 30 is enabled to identify the mirror source device by referring to the mirror source information in the remote mirror frame. More specifically, the monitoring device can identify the mirror source by referring to the sender port information and the destination port information sequentially added by each of the switches that have transmitted the remote mirror frame. That is, by using the above-described embodiment, it is possible to identify which port of which switch is the monitor port, based on the sequentially added sender port information and the destination port information. Among the sender port information inserted in the unique field, the last or oldest sender port information in the unique field, that is, the sender port information immediately before the EOF, indicates the monitor port. If the monitor port can be identified, then the device connected to the monitor port can be identified as the mirror source device. In the example operation described above, the ECU 23 can be identified as a mirror source device.

A switch that performs port mirroring adds a unique field to a preset position in the mirror frame, and stores the sender port information and the destination port information as transfer route information in the added unique field. Thereafter, when receiving a mirror frame from another switch, each switch stores (i.e., adds) its own sender port information and destination port information as transfer route information in the unique field of the mirror frame. As such, it is possible to add additional transfer route information to the original frame without affecting other information in the original frame.

The unique field is a field provided at a position between the source MAC address field and the type field in an Ethernet frame. It is possible to add the transfer route information without affecting the Ethernet protocol.

Each switch determines whether or not the received frame is a mirror frame based on whether the received frame has a unique field. As such, it is possible to easily determine whether the received frame is a mirror frame.

In the unique field of a frame, an identification code is included that enables the frame to be identified as a mirror frame. As such, each switch can correctly determine whether the received frame is a mirror frame based on the identification code.

5. Other Embodiments

Although an embodiment of the present disclosure has been described above, the present disclosure is not limited to the above-described embodiment, and various modifications can be made.

For example, when the communication network 1 determines that the network traffic in one or more of the switches (e.g., 11-15) is excessive, the network 1 may stop the transfer of a low-priority frame and such a frame may be discarded. In such a case, the priority of the mirror frame may be set to a second-to-top priority or lower. That is, the network 1 may be configured to control the priority of the mirror frame to control or alleviate network congestion.

The communication protocol used by the network 1 may be different than the Ethernet protocol. The hop count value or the I/O information also may not be included in the mirror frame. The transfer route information may be added to a preset position in the Ethernet payload field.

A plurality of functions of one element in the above embodiment may be implemented by using a plurality of elements, or one function of one element may be implemented by using a plurality of elements. A plurality of functions of a plurality of elements may be implemented by using one element, or one function implemented by a plurality of elements may be implemented by using only one element. A part of the configuration of the above embodiment may be omitted. In addition to the above-described switch, a system using such switch as its element, a program for controlling a computer to function as such a switch, a non-transitory, tangible storage medium such as a semiconductor memory or the like for storing such a program, and a method for performing a remote monitoring may also be realizable embodiments of the present disclosure.

What is claimed is:

1. A switch comprising:
   a microcomputer including: a memory and at least one processor; and
   a plurality of ports associated with the microcomputer,
   wherein the switch is configured to receive at least the following types of set-up information:
   first set-up information designating the switch as one of a mirroring switch and a mirror transfer switch; and
   second set-up information including input/output information designating the mirroring switch as one of: a reception mirroring switch for mirroring frames received at a first designated port, and a transmission mirroring switch for mirroring frames transmitted from a second designated port,
   wherein the switch is configured to:
   receive a first frame at a sender port;
   determine that the switch is NOT designated as the mirroring switch;
   determine that the first frame was received by the first designated port;
   determine that the first frame has a unique field, indicating that the first frame is a remote mirror frame;
   generate an expanded remote mirror frame by inserting subsequent sender port information and subsequent port information in the unique field; and
   transmit the expanded remote mirror frame from the destination port.

2. The switch of claim 1, wherein the unique field further includes:
   the first set-up information;
   a hop count; and
   the second setup information.

3. A switch comprising:
   a microcomputer including: a memory and at least one processor; and
   a plurality of ports associated with the microcomputer,
   wherein the switch is configured to receive at least the following types of set-up information:
   first set-up information designating the switch as one of a mirroring switch and a mirror transfer switch; and
   second set-up information including input/output information designating the mirroring switch as one of: a reception mirroring switch for mirroring frames received at a first designated port, and a transmission mirroring switch for mirroring frames transmitted from a second designated port, wherein the switch is configured to:
receive a first frame at a sender port;
determine that the switch is NOT designated as the mirroring switch;
determine that the first frame was received by the first designated port;
determine that the first frame does NOT have a unique field, and that the first frame is NOT a remote mirror frame;
send the first frame to a destination port; and
relay the first frame as a normal frame from the destination port.

4. A repeater device for use in a communication network and configured to transfer a mirror frame to a monitor device, wherein the mirror frame includes a header, a type, and a payload, and wherein the header includes a sender media access control (MAC) address, the repeater device comprising:
a network switch having a plurality of ports, and
a microcomputer configured to determine whether the repeater device functions as a mirroring switch configured to generate the mirror frame by port mirroring and to transfer the mirror frame, or functions as a mirror-transfer switch that transfers the mirror frame, the microcomputer including
a first transfer unit configured to
add a first set of port information to the mirror frame as a first set of transfer route information, the first set of port information indicative of one of the plurality of ports in the repeater device that functions as a monitor port on which the port mirroring is performed, and another of the plurality of ports in the repeater device that functions as a first destination port from which the mirror frame is output and transferred to the monitoring device, and
output the mirror frame to which the first set of transfer route information has been added from the first destination port, when the repeater device functions as the mirroring switch, and
a second transfer unit configured to
add a subsequent set of port information to the mirror frame as a subsequent set of transfer route information, the subsequent set of port information indicative of one of the plurality of ports in the repeater device that receives the mirror frame from another repeater device, and another of the plurality of ports in the repeater device that functions as a subsequent destination port from which the received mirror frame is output and transferred to the monitoring device, and
output the received mirror frame to which the subsequent set of transfer route information has been added from the subsequent destination port, when the repeater device functions as the mirror-transfer switch.

5. The repeater device of claim 4, wherein
the first transfer unit is further configured to add a unique field at a preset position in the mirror frame, and to store the first set of transfer route information in the unique field, and the second transfer unit is further configured to receive the mirror frame, and to store the subsequent set of transfer route information in the unique field of the received mirror frame.

6. The repeater device of claim 5, wherein
the repeater device is configured for use in the communication network using an Ethernet standard, and wherein
the mirror frame follows the Ethernet standard and includes a source MAC address field and a type field, and wherein
the unique field is at a position between the source MAC address field and the type field in the mirror frame.

7. The repeater device of claim 5, wherein
the second transfer unit is further configured to determine whether a received frame is the mirror frame based on whether the received frame includes the unique field.

8. The repeater device of claim 7, wherein
the unique field includes an identification code that identifies whether the received frame is the mirror frame.

9. A repeater device for use in a communication network and configured to transfer a mirror frame to a monitor device, wherein the mirror frame includes a header, a type, and a payload, and wherein the header includes a sender media access control (MAC) address, the repeater device comprising:
a network switch having a plurality of ports; and
a microcomputer configured to determine whether the repeater device functions as a mirroring switch or as a mirror-transfer switch,
wherein
when the microcomputer determines that the repeater device functions as the mirror switch, the network switch is configured to
receive a communication frame from a source device at a monitor port, the monitor port one of the plurality of ports on the network switch,
mirror the communication frame by port mirroring to generate a mirror frame,
transfer the mirror frame from the monitor port to a first destination port, the first destination port another port of the plurality ports on the network switch,
add a first set of transfer route information to the mirror frame, the transfer route information including monitor port information and first destination port information, and
output the mirror frame with the first set of transfer route information from the first destination port,
and wherein
when the microcomputer determines that the repeater device functions as the mirror-transfer switch, the network switch is configured to
receive the mirror frame from another repeater device at a sender port, the sender port one of the plurality of ports on the network switch,
transfer the mirror frame from the sender port to a subsequent destination port, the subsequent destination port another port of the plurality ports on the network switch,
add a subsequent set of transfer route information to the mirror frame, the subsequent set of transfer route information including sender port information and subsequent destination port information, and
output the mirror frame with the subsequent set of transfer route information from the subsequent destination port.

10. The repeater device of claim 9, wherein
when the microcomputer determines that the repeater device functions as the mirror switch, the network switch is further configured to add a unique field at a preset position in the mirror frame, and to store the first set of transfer route information in the unique field, and wherein
when the microcomputer determines that the repeater device functions as the mirror-transfer switch, the network switch is further configured to store the subsequent set of transfer route information in the unique field of the mirror frame.

11. The repeater device of claim 10, wherein
the repeater device operates in accordance with an Ethernet standard and is configured for use in the communication network using the Ethernet standard, and wherein
the mirror frame is setup in accordance with the Ethernet standard and includes a source MAC address field and a type field, and wherein
the unique field is at a position between the source MAC address field and the type field in the mirror frame.

12. The repeater device of claim 10, wherein
when the microcomputer determines that the repeater device functions as the mirror-transfer switch, the network switch is further configured to determine whether a frame received at the sender port is the mirror frame based on whether the received frame includes the unique field.

13. The repeater device of claim 12, wherein
the unique field includes an identification code that identifies whether the received frame is the mirror frame.

\* \* \* \* \*